United States Patent
Beetz et al.

(10) Patent No.: US 9,985,495 B2
(45) Date of Patent: May 29, 2018

(54) APPARATUS FOR MOUNTING A MOTOR SUCH THAT VIBRATIONS ARE DECOUPLED

(71) Applicant: Brose Fahrzeugteile GmbH & Co. Kommanditgesellschaft, Wuerzburg, Wuerzburg (DE)

(72) Inventors: Stefan Beetz, Barnin (DE); Maurad Berkouk, Le Conquet (FR); Sebastien Labat, Schwanfeld (DE); Attila Simofi-Ilyes, Clarkston, MI (US); Eric Plagens, Rochester Hills, MI (US)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 0 days. days.

(21) Appl. No.: 15/401,492

(22) Filed: Jan. 9, 2017

(65) Prior Publication Data
US 2017/0117773 A1 Apr. 27, 2017

Related U.S. Application Data

(63) Continuation of application No. PCT/EP2015/065743, filed on Jul. 9, 2015.

(30) Foreign Application Priority Data

Jul. 9, 2014 (DE) .................. 10 2014 010 176

(51) Int. Cl.
*H02K 5/24* (2006.01)
*H02K 7/14* (2006.01)
(Continued)

(52) U.S. Cl.
CPC ........... *H02K 5/24* (2013.01); *B60H 1/00521* (2013.01); *B60L 1/003* (2013.01); *H02K 7/14* (2013.01); *B60H 2001/006* (2013.01)

(58) Field of Classification Search
CPC . H02K 5/24; H02K 7/14; B60L 1/003; B60H 1/00521; F16F 1/373; F16F 1/38;
(Continued)

(56) References Cited

U.S. PATENT DOCUMENTS

2007/0001522 A1* 1/2007 Nitzsche ................. F16F 15/04
310/51
2011/0101800 A1* 5/2011 Schiel ................. F04D 25/0606
310/51

(Continued)

FOREIGN PATENT DOCUMENTS

DE 197 30 810 A1 2/1998
DE 199 42 953 A1 3/2000
(Continued)

*Primary Examiner* — Naishadh Desai
(74) *Attorney, Agent, or Firm* — Muncy, Geissler, Olds & Lowe, P.C.

(57) ABSTRACT

An apparatus for mounting an electric motor, in particular a fan drive of a heating or air-conditioning system of a motor vehicle, such that vibrations are decoupled, having a number of elastic damping elements which are plug-mounted on the motor, and also comprising a corresponding number of mounting contours, which are associated with said damping elements, in an external housing which at least partially surrounds the motor housing, wherein the respective damping element has a central insertion slot for the corresponding radial lug, and wherein the respective damping element has material spokes, which extend in the manner of a star starting from the insertion slot, so as to form spoke sections which face one another and between which slot regions which are free of material and open at the periphery are formed.

19 Claims, 7 Drawing Sheets (51) Int. Cl.
*B60L 1/00* (2006.01)
*B60H 1/00* (2006.01)

(58) Field of Classification Search
CPC .......... F16F 1/3807; F16F 1/3835; F16F 7/00;
F16F 7/003; F16F 7/12; F16F 15/00;
F16F 15/10; F16F 15/12
See application file for complete search history.

(56) References Cited

U.S. PATENT DOCUMENTS

| 2012/0126091 | A1* | 5/2012 | Kleindorfer | B60K 13/04 |
| | | | | 248/674 |
| 2013/0287604 | A1* | 10/2013 | Barkic | F04D 29/601 |
| | | | | 417/410.1 |
| 2013/0328421 | A1* | 12/2013 | Barkic | F04D 27/008 |
| | | | | 310/51 |

FOREIGN PATENT DOCUMENTS

| DE | 100 54 556 A1 | 5/2002 |
| DE | 10 2006 061 582 A1 | 7/2008 |
| DE | 10 2009 036 869 A1 | 2/2011 |
| DE | 10 2010 041 177 A1 | 3/2012 |
| WO | WO 2012/089450 A1 | 7/2012 |

* cited by examiner

APPARATUS FOR MOUNTING A MOTOR SUCH THAT VIBRATIONS ARE DECOUPLED

This nonprovisional application is a continuation of International Application No. PCT/EP2015/065743, which was filed on Jul. 9, 2015, and which claims priority to German Patent Application No. 10 2014 010 176.2, which was filed in Germany on Jul. 9, 2014, and which are both herein incorporated by reference.

BACKGROUND OF THE INVENTION

Field of the Invention

The invention relates to an apparatus for mounting an electric motor, in particular a fan drive of a heating or air conditioning system of a motor vehicle, such that vibrations are decoupled, having a number of elastic damping elements for damping or decoupling operation-induced (mechanical) vibrations that are opposite an external housing, at least partially surrounding the electric motor or its motor housing.

Description of the Background Art

Mounting apparatuses of an electric motor is known, for example, from DE 197 30 810 A1, from DE 199 42 953 A1 or from DE 100 54 556 A1.

From DE 10 2010 041 177 A1, which corresponds to US 20130328421, an apparatus for the vibration-decoupled mounting of an electric motor, in particular a fan motor, is known. The decoupled mounting of the electric motor on an external housing is effected by means of at least one decoupling element, which is seated on a radial connecting lug of the motor housing (pole housing). To eliminate the risk of a collision between the connecting lug and the external housing, the decoupling element surrounds the motor-side connecting lug with a shell part in the form of a sleeve, which is supported by at least one web on an outer part which surrounds the shell part in a frame-like manner. The decoupling element is accommodated over this circumferentially (azimuthally) closed outer part, into a receptacle of the external housing preferably designed in two parts.

SUMMARY OF THE INVENTION

It is therefore an object of the invention to improve the decoupling properties of an apparatus of the afore-mentioned type to prevent or at least largely avoid the transmission of operation-induced vibrations and acoustic excitations from the electric motor to its surroundings, in particular to an external housing surrounding said motor. Furthermore, decoupling or damping-technical adaptations to different operating-induced vibration excitations are to be made possible in a simple manner, for example, by allowing for different resonances resulting from imbalances and/or due to magnetic properties of the electric motor.

To this end, an apparatus is provided for the vibration-decoupled mounting of an electric motor, which essentially comprises elastic damping elements, which on the one hand are plug-mounted to motor-side radial lugs, and which on the other hand are arranged in holding contours of an external housing surrounding the electric motor or its motor housing. The external housing, in particular, is a car body part or a built-in part of a motor vehicle, for example, in the region of a center console or a dashboard assembly of the vehicle, wherein the electric motor serves as an electromotive drive of a fan of a heating or air conditioning system of the vehicle. The lugs on the motor side can be attached to the motor housing of said external housing, stamped or bend-formed of its material, or formed onto an intermediate housing part which accommodates the electric motor. In this context, an electric motor is, in particular, a brushless internal rotor motor.

The damping element, which has a central insertion slot for the corresponding motor-side radial lug, comprises material spokes extending in the manner of a star from the insertion slot, with formation of mutually facing spoke sections between which slot regions free of material and open at the periphery are formed. Advantageously, the material spokes of the damping element are arranged in an X-shape.

In an embodiment, at least one or two of the material-free slot regions extend in the direction along the radial lug over only a part of the radial thickness of the damping element extending in the direction of insertion. In other words, material regions that are closed on the periphery in the radial direction remain in the insertion direction of the damping element, that is to say, with respect to the motor axis of the electric motor, into which material recesses (openings) in the form of slots, grooves, beads or bores can be inserted retroactively to adapt the damping behavior of the damping element to the oscillation or vibration characteristics of the respective electric motor. In this way, in particular, different excitation directions can be accommodated, and the decoupling of the vibrations or acoustic excitations can be varied in such a way that different vibration orders, for example, as a result of the respective motor imbalance, can be optimally damped without essentially changing the damping concept. In addition, the first order of motor imbalance and a higher order of magnetic influences of the electric motor can be advantageously damped at the same time or decoupled from the external housing.

An embodiment provides that at least one or two of the material-free slot areas is formed between mutually facing spoke sections by a bead-like material recess. These bead-like material recesses have a bead floor facing the insertion slot and two bead side walls extending in the direction of the radial lug, and a bead wall extending transversely with respect to the insertion direction of the insertion slot. The material spokes extending in an X-shaped manner are particularly advantageously formed by two material recesses in the form of such beads which are located opposite one another in relation to the insertion slot.

The spoke sections formed by the material spokes, between which the bead-like material recesses are located, suitably provide sufficient material for the insertion of radial or inclined bores, which can be designed as through-bores or blind bores. These again enable the decoupling properties of the damping element to be modified, owing to the specific adaptation to the oscillation behavior of the electric motor. In other words, the damping properties of the damping element can be selectively adjusted with respect to different excitation orders at different vibration resonances as a result of motor-specific imbalances and/or magnetic characteristics of the respective electric motor.

The respective damping element is expediently mirror-symmetrical to the insertion slot, relative to the motor axis of the electric motor. In particular, with bead-like material recesses, in each case two spoke sections are formed axially above and below the insertion slot of the damping element, which extend to one another in a V-shape. In this case, the material recesses are open not only on the periphery but also on one of those surfaces of the damping element to which the insertion slot runs perpendicular (normal). Suitably, further material-free transitions are formed in the region of the insertion slot of the damping element, which extend appropriately over the entire extent of the damping element extending transversely to the insertion direction, but only over a part of the radial thickness of the damping element in the insertion direction.

An embodiment provides for a damping element with an essentially cuboid basic body into whose at least one peripheral surface, which faces away from the insertion slot, a slot or bead open on the peripheral side is inserted. A further peripherally open slot or bead is expediently introduced into at least one further peripheral surface of the basic body, forming a waisted section. In addition, or alternatively, at least one radial through-hole or blind bore is inserted into the basic body.

Due to the geometry of the further slot (bead) and of the or each further bore, as well as due to their respective removal of material, different oscillation and/or resonant frequencies can be damped in a simple manner in consequence of operation-induced oscillation excitations of the electric motor without modifying the basic decoupling or damping concept of the inventive apparatus, in particular, without designing the damping elements in a fundamentally different manner.

According to an embodiment, the respective damping element includes the material-free transition, which is formed between the spoke sections and in the area of the insertion slot, in the area of its contact surface facing the electric motor, whereas the peripherally open slot or bead provided by the formation of the waisted section is provided on the opposite, rear-side support surface of the damping element.

An electric motor, in particular, of a fan drive of a heating or air conditioning system of a motor vehicle, has a suitable number of, preferably three, elastic damping elements, which are arranged on the periphery, uniformly distributed and plug-mounted on the motor side. In this case, the motor housing is expediently formed by a first bearing plate and a second bearing plate, each having a flange region, from which the radial lugs for the damping elements are formed. Preferably, the motor housing is held in a vibration-decoupled manner by means of the damping elements in a two-part external housing with an annular or frame-shaped first housing part and a second housing part which is joined thereto. In this case, the holding contours for the damping elements are preferably introduced into the housing parts in the form of insertion pockets which suitably have supporting and/or joining elements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
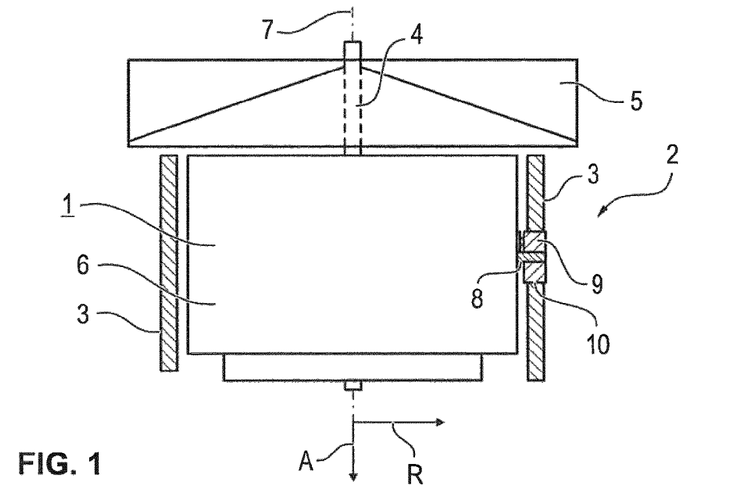
FIG. 1 shows schematically in partial cross-section, an apparatus for the vibration-decoupled holding of an electric motor of a fan drive using damping elements, only one of which is illustrated.

FIG. 1 schematically shows an electric motor 1, which is fastened in a vibration-decoupled manner to an external housing 3 as a component of a motor vehicle via a mount or a holding apparatus 2. On a motor shaft 4, the electric motor 1 supports a fan wheel 5 of a fan drive of a heating or air conditioning system of the vehicle. The electric motor 1 comprises a motor housing 6 which coaxially surrounds the motor axis 7. The axial and radial direction relative to this motor axis 7 is designated by A and R, respectively, and is illustrated in FIG. 1. The external housing 3 can be a car body or a built-in part, for example, in the region of a center console of the motor vehicle.

The mount 2 preferably comprises three radial lugs 8 arranged equidistantly circumferentially on the cylindrical motor housing 6, on each of which a resilient, for example, rubber-elastic damping element 9 is plug-mounted. The latter is suitably positively, and thus axially and circumferentially (azimuthally), secured in a holding contour 10 formed by a recess (housing recess) of the external housing 3.

Figure 2:
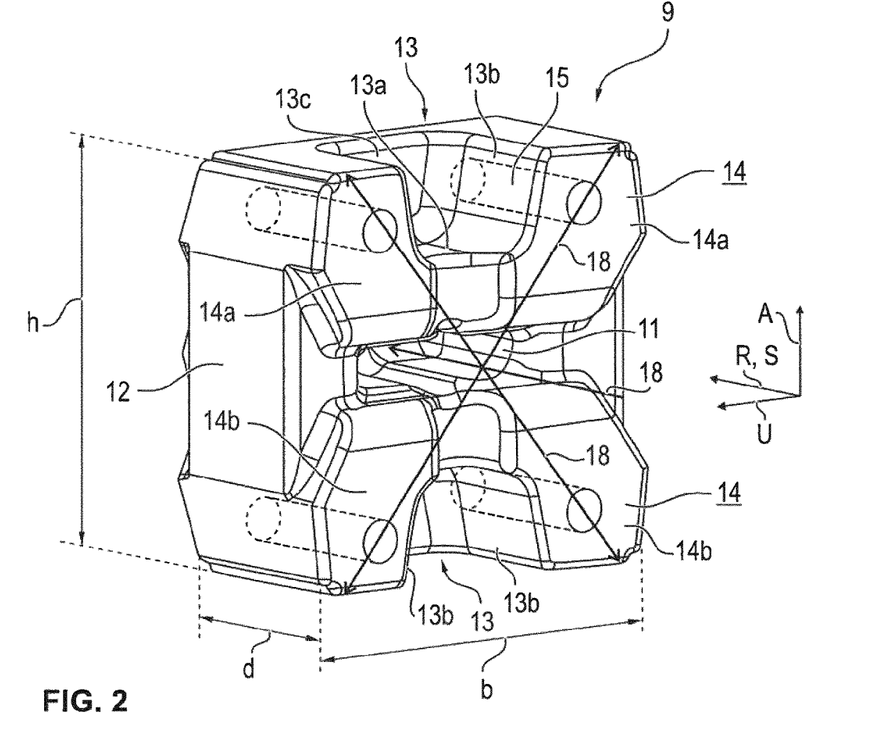
FIG. 2 shows a perspective view of the damping element with material spokes extending therefrom in the shape of a star and therebetween, material-free and peripherally open slot regions.

The respective damping element 9 is illustrated in FIG. 2. The damping element 9 comprises an insertion slot 11 extending in the radial direction R for accommodating the respective radial lug 8. The damping element 9 having an elastomer is formed from a cuboid, in particular, a cubic basic body 12 in which on the one hand, the radial insertion slot 11 and, on the other, bead-like slot regions 13 are inserted. These circumferentially open slot regions 13 are material-free regions (material recesses) of the basic body 12 and thus, of the damping element 9.

The bead-like slot regions 13 each form a bead or slot floor 13a facing the insertion slot 11 and two bead or slot side walls 13b extending in the radial direction R, as well as a bead or slot wall 13c extending transversely to the insertion direction S extending in the radial direction R. A substantial component of the damping element 9 are material spokes 14 extending in the manner of a star, in particular an X-shape, with spoke sections 14a and 14b facing one another in pairs. These spoke sections 14a, 14b of the damping element 9, which is mirror-symmetrical to the insertion slot 11, extend approximately V-shaped to form the circumferentially open slot areas 13.

The bead-like slot regions 13 extend along the radial direction R and thus along the radial lugs 8, preferably only over part of the radial depth or thickness d of the damping element 9 extending in the direction of insertion S. The transitional area between the spoke sections 14a located above the insertion slot 11 and the spoke sections 14b located below the insertion slot 11, along the insertion slot 11 in the peripheral direction of the electric motor 1 or its housing 6, i.e. along the azimuthal width b of the damping element 9 as shown in FIG. 1, is free of material over a certain area of the radial thickness d.

Overall, the damping element 9 thus has a remaining material region on its outer peripheral surface facing away from the insertion slot 11, into which material recesses for adjusting motor-specific decoupling or damping properties of the damping element 9 can be introduced.

In this context, bores 15 extending in the radial direction R are introduced in FIG. 2, which pass through the spoke sections 14a, 14b and can be designed as through-holes or as blind bores. The circumferential direction relative to the electric motor 1 or its housing 6, along which the indicated azimuthal width b of the damping element 9 extends, is denoted here by U. The axial height of the damping element 9 or its basic body 12 is designated by h (FIG. 2).

Figure 3:
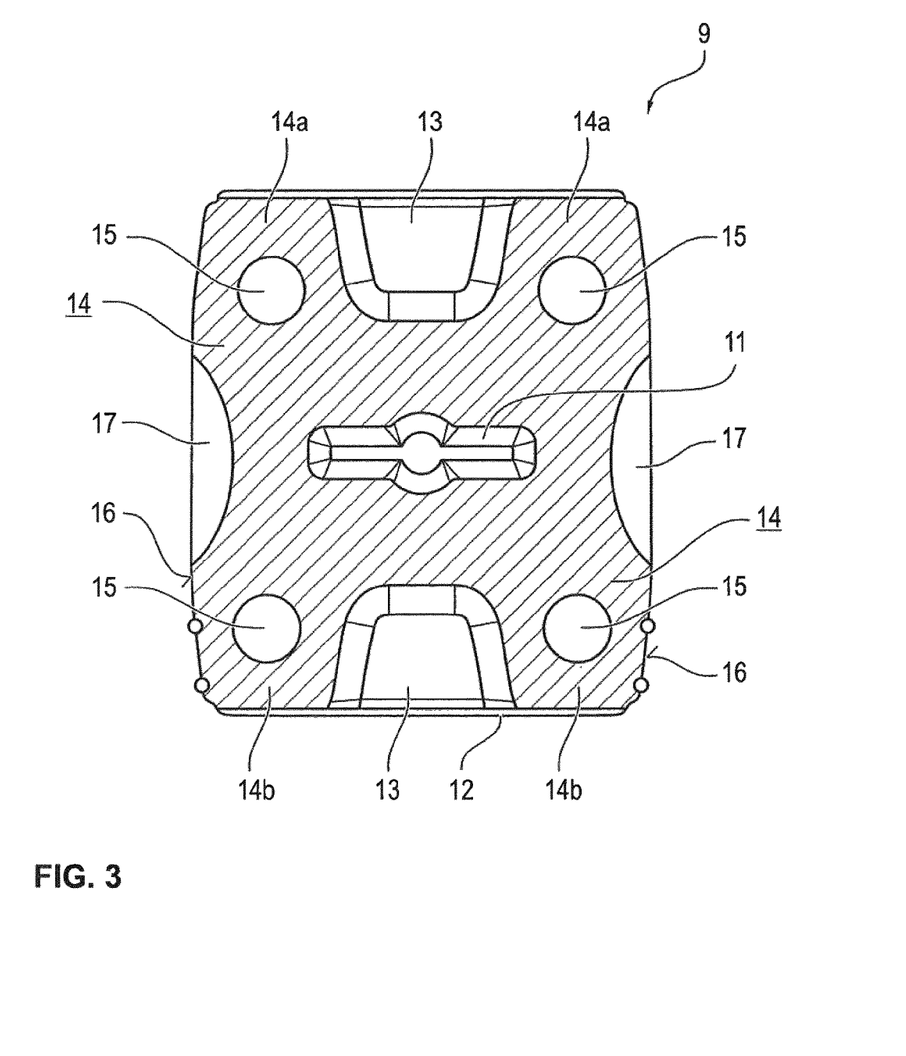
FIG. 3 shows a cross-sectional view of the damping element according to FIG. 2, having arc-shaped material recess insertions on both sides of an insertion slot.

FIG. 3 shows the damping element 9 in a cross-section. The insertion slot 11 as well as the bead-like slot regions 13, which are open on the circumference, are again visible between the spoke sections 14a and 14b of the material spokes 14 extending in an X-shaped manner. In the exemplary embodiment, by forming a waisted region of the damping element 9 or its basic body 12, arcuate or cylindrical shell-like material recesses 17 are inserted into the circumferential surfaces 16 of the basic body 12 of the damping element 9 which lie opposite each other in the circumferential direction U and do not have open slot regions 13. These recesses also serve to adapt the damping element 9 to motor-specific oscillation characteristics of the respective electric motor 1 and thus to the specific damping of operating-induced vibrations and acoustic excitations of the electric motor 1, which are selectively decoupled from the external housing 3 surrounding the electric motor 1 by means of the or each damping element 9.

The main operating lines of the operation-induced forces resulting from the preferred X-shape of the damping element 9 are illustrated in FIG. 2 by the action arrows 18.

Figure 4A:
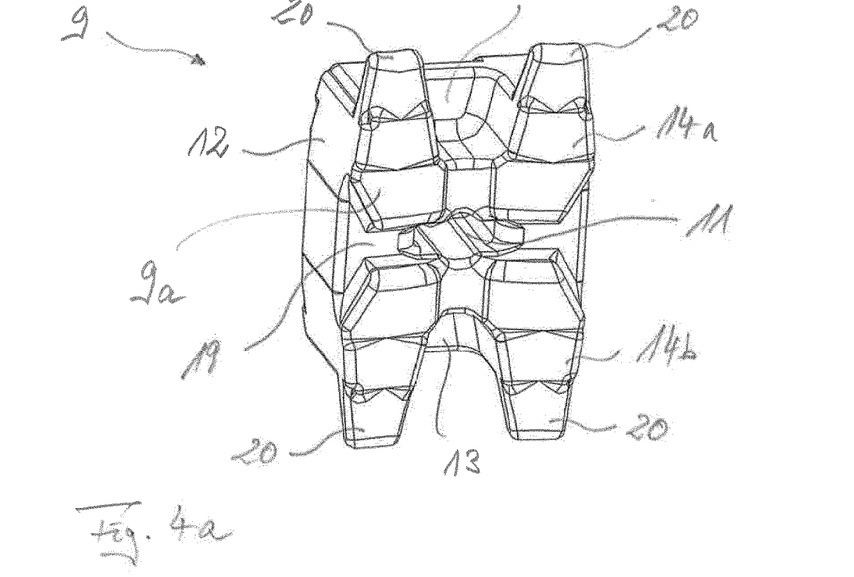
FIGS. 4a and 4b show perspective views of a further embodiment of the damping element with lugs which extend beyond the basic body thereof, with a view to the motor-side bearing surface or to the opposing rear or support surface.
Figure 4B:
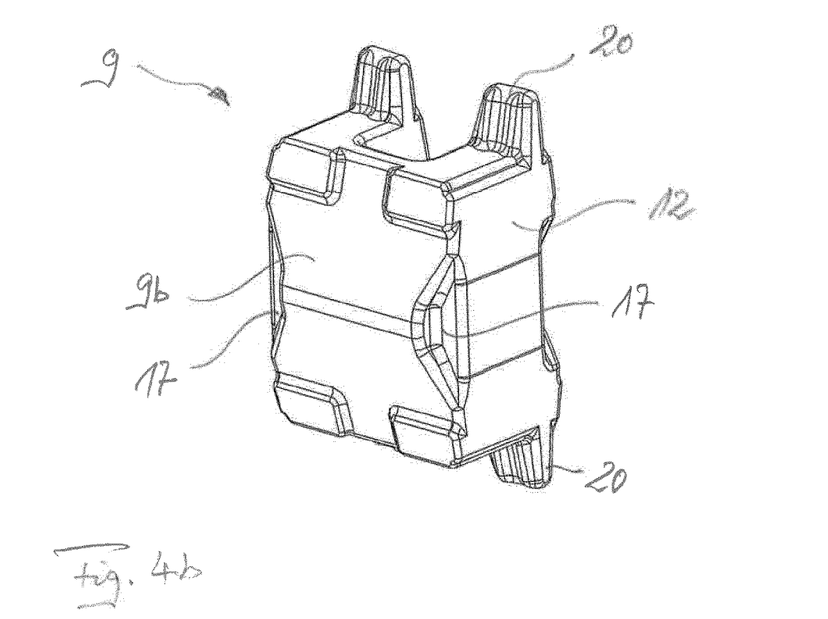
Figure 5A:
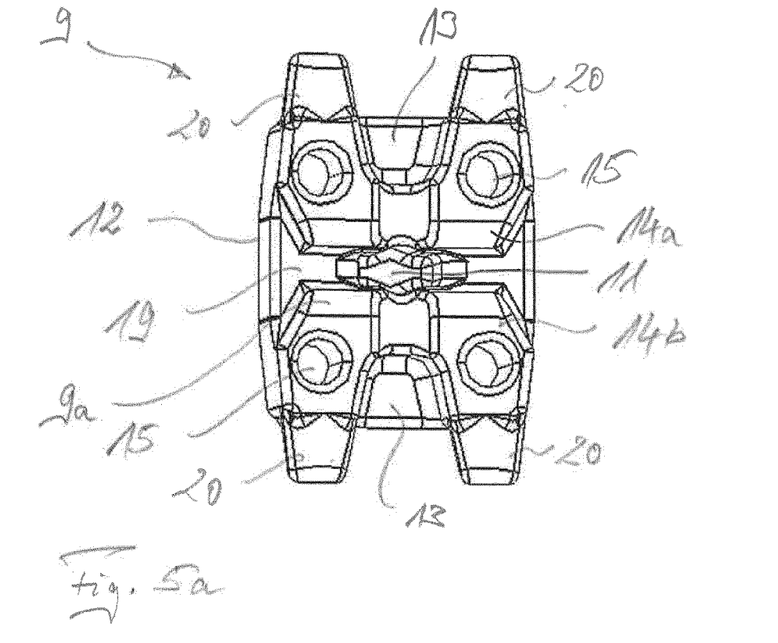
FIGS. 5a and 5b show perspective views of a damping element according to FIGS. 4a and 4b with through-holes (bores) in the region of the spoke sections.
Figure 5B:
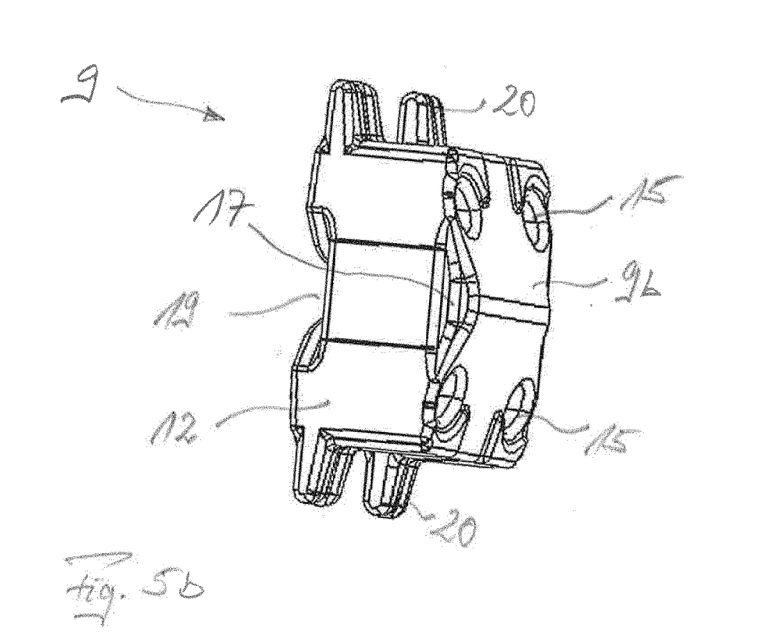

FIGS. 4a and 4b and FIGS. 5a and 5b show further embodiments of the damping element 9 with or without bores 15 extending in the radial direction R, which in the embodiment according to FIGS. 5a and 5b again pass through the spoke sections 14a, 14b and can be designed as through-holes or as blind bores. A substantial component of this damping element 9 are again the material spokes 14 extending in the manner of a star (X-shape) with the spokes sections 14a, 14b facing each other in pairs. As is the case in the embodiment according to FIG. 2, a material-free transition 19 is formed between these spoke sections 14a, 14b in the area of the insertion slot 11 which extends over the entire width b of the damping element 9 and along the radial lug 8, only over a part of the radial thickness d of the damping element 9 extending in the direction of insertion S.

In the case of the two further embodiments, the damping element 9 again comprises the insertion slot 11 extending in the radial direction R for accommodating the respective radial lug 8 within the cuboid basic body 12, as well as the bead-like, i.e. material-free slot regions 13 open on the circumferential side. The insertion slot 11 can be accessed only from the motor-side contact side or contact surface 9a facing the motor 1 or its motor housing 6, while the opposing support surface 9b of the damping element 9 is closed.

Figure 6A:
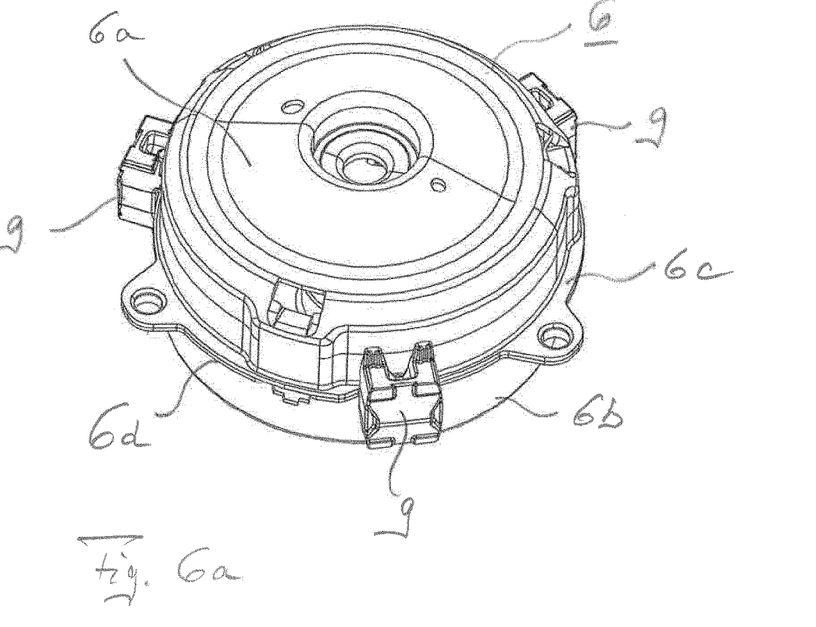
FIGS. 6a and 6b show perspective representations of the motor housing of the electric motor, which is constructed from an A and B-side bearing plate, having flange-sided radial lugs with or without damping elements plug-mounted thereon.

On the contact side or contact surface 9a in the region of the spoke sections 14a, 14b, in each case a lug 20 is formed on the basic body 12, respectively projecting beyond the axial height h (FIG. 2) of the basic body 12. The lugs rest on the motor housing 6 in the mounted state shown in FIG. 6a and improve the system, the positioning accuracy and/or the tilt stability of the damping element 9 on the motor housing 6.

Figure 7:
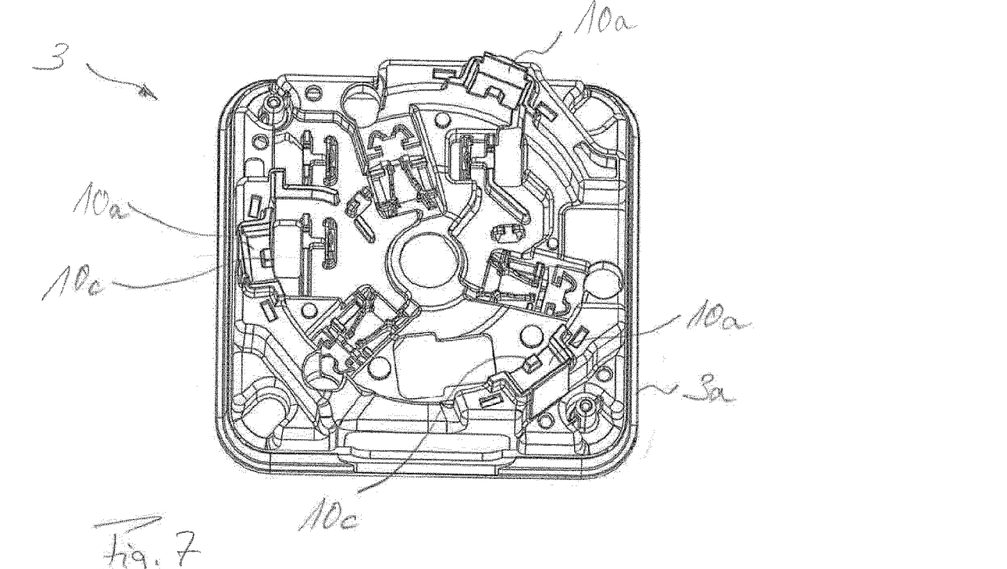
FIG. 7 shows a first housing part of an external housing receiving the electric motor or its motor housing in a vibration-decoupled manner, having insertion pockets/sections with joining contours for the damping elements.
Figure 8:
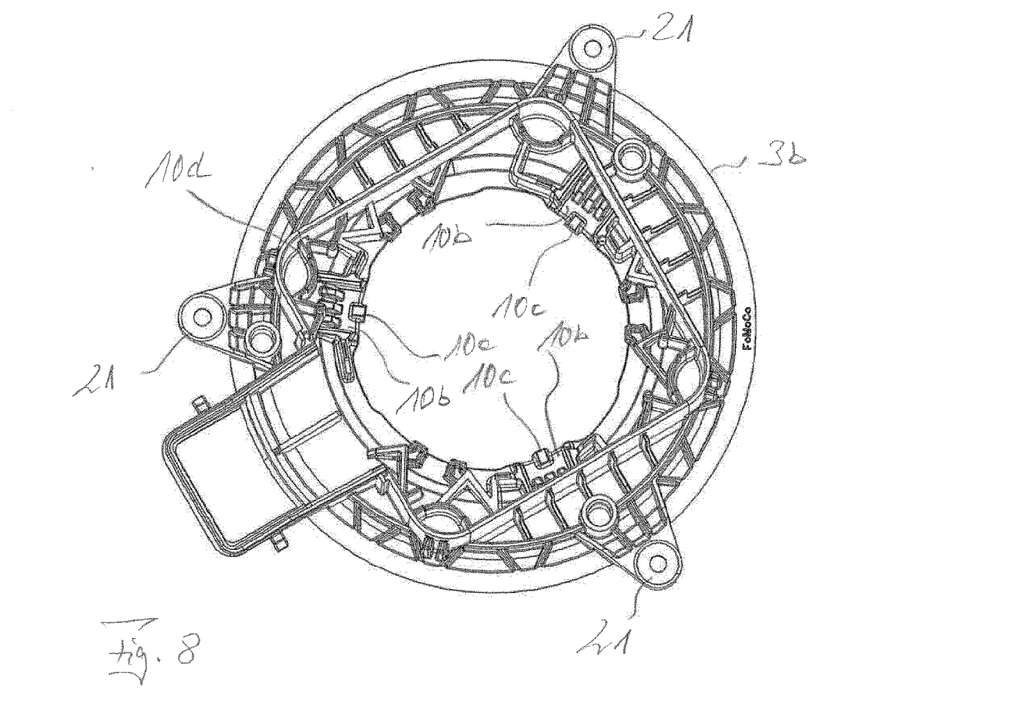
FIG. 8 shows a second housing part of the external housing having corresponding insertion pockets/sections with additional supporting ribs for the damping elements.
Figure 9A:
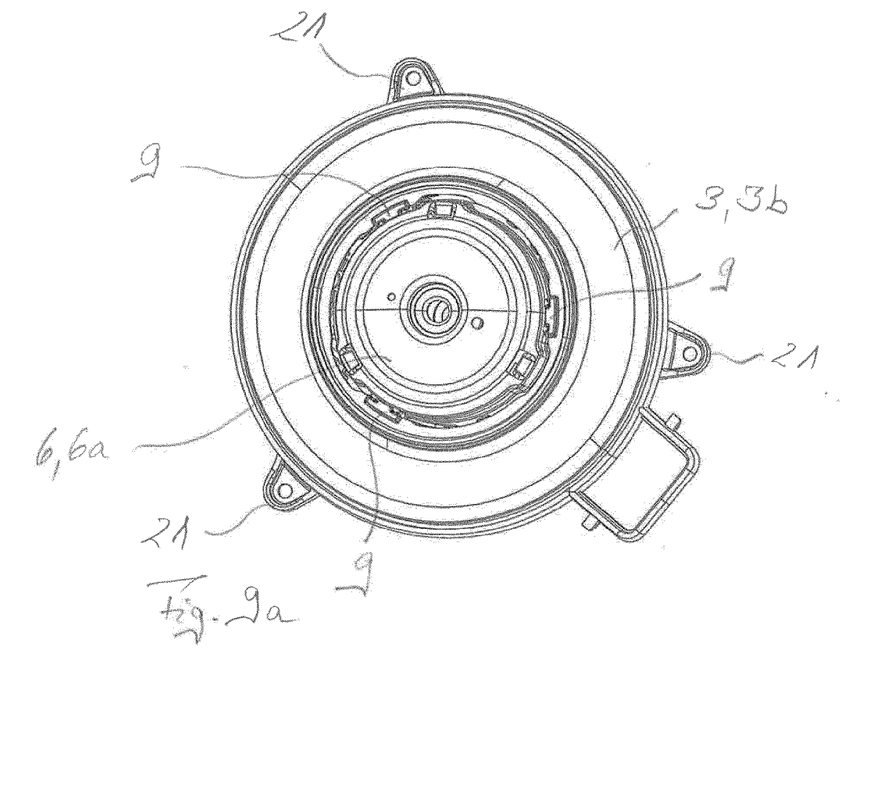
FIGS. 9a and 9b show a perspective top view or side view of the electric motor held in the external housing in a vibration-decoupled manner.

FIGS. 7 and 8 show an embodiment of the external housing 3 which is used as a motor carrier and is advantageously designed in two parts, and a first housing part (housing lower part) 3a according to FIG. 7, and a second housing part 3b according to FIG. 8, joined thereto in the mounted state. FIG. 9a shows a top view, and FIG. 9b a perspective side view of the mounted state of the motor carrier or the external housing 3 with an electric motor 1 or motor housing 6 held therein in a vibration-decoupled manner by means of the damping elements 9.

Figure 6B:
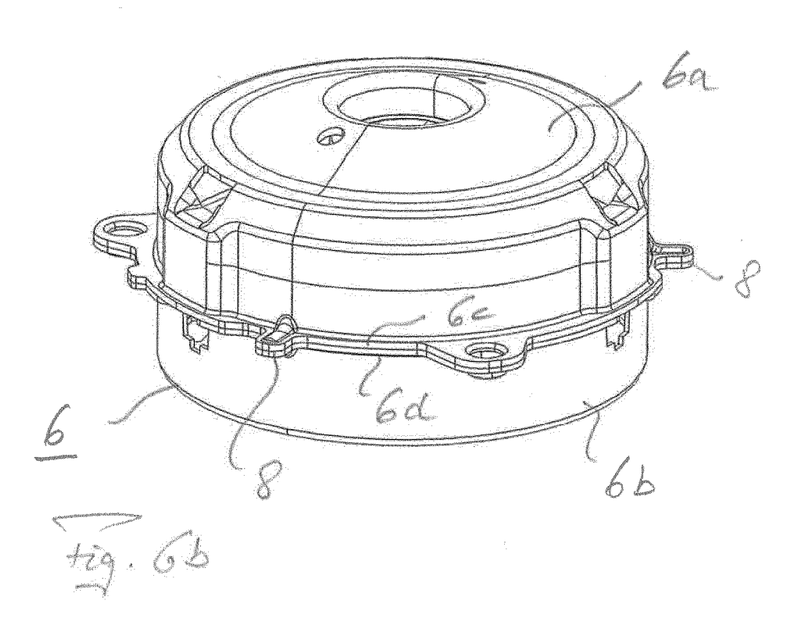

In the positions of the damping elements 9, which are staggered by 120°, the first housing part or lower housing part 3a has pocket-like or half-pocket-like holding contours in the form of insertion pockets 10a in which the damping elements 9 that are plugged into or plug-mounted on the electric motor 1 or its motor housing 6, as shown in FIG. 6, are seated over a part of their axial height h. Joining contours 10c provided and formed on the bottom side of the insertion pockets 10a correspond to one of the slot regions or to material recesses 13 of the respective damping element 9.

Analogously, at the respective positions of the damping elements 9 of the second housing part 3b shown in FIG. 8 from the rear side, there are corresponding insertion pockets 10b which have bottom-side joining contours 10c that are also raised, which preferably project positively into the opposing slot regions or material recesses 13 of the respective damping element 9. In addition, or as an alternative, on the bottom side in the exemplary embodiment, three rib-like supporting contours 10d are inserted into the insertion pockets 10b of this second housing part 3b. The respective damping element 9 is thus only partially supported on these supporting contours 10d so that elastic deformations of the damping element 9 can be accordingly advantageously absorbed or offset.

According to FIG. 9a, the second housing part 3b of the motor carrier or external housing 3 is at least approximately annular in shape on the top side and serves to accommodate the electric motor or its motor housing 6. FIG. 9a also shows the three damping elements 9 in the mounted state as a vibration-decoupled mount of the electric motor 1 or its housing 6 in the mounted external housing (motor carrier) 3.

Figure 9B:
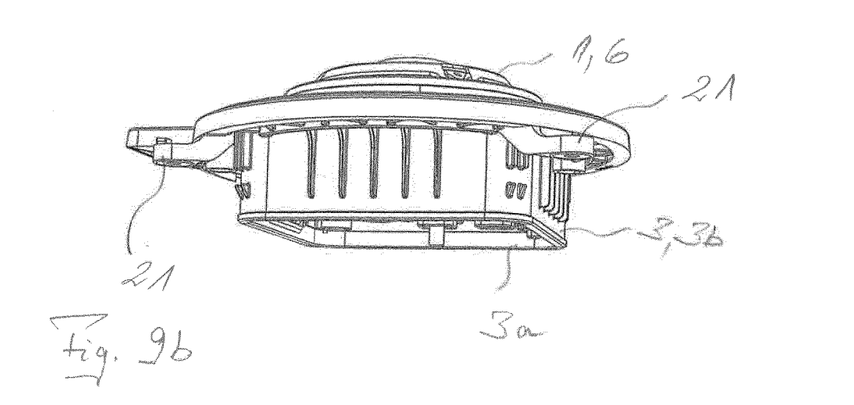

FIG. 9b shows the corresponding mounted state in a perspective side view. Mounting lugs 21 formed on the external housing 3 or in the exemplary embodiment on its second housing part 3b are used for mounting, in particular, for screw mounting the motor carrier 3 to an electromotive motor 1 which is held in the decoupled condition in the motor vehicle, and there, preferably in the region of the center console. The motor carrier or the external housing 3 thus forms the mechanical interface between the electric motor 1 serving as the fan drive of a heating or air conditioning system of the vehicle and the corresponding vehicle mounting structure, for example, in the region of the center console.

Due to the use of a suitable elastic material of the damping element 9, for example NBR, EPDM, silicone or PU, as well as particularly due to its geometric shaping with material spokes 14 extending in the manner of a star, in particular an X-shape, particularly effective decoupling properties are achieved, preferably over the entire temperature range that is typical of vehicle components. This means that over a wide temperature range of, for example, −40° C. to +80° C., the respective damping element 9 maintains, on the one hand, sufficient elasticity (flexibility) for vibration damping and vibration decoupling of the electric motor 1 from the external housing 3 and, on the other hand, a sufficient stiffness, in particular in order to achieve sufficient damping of the oscillation amplitudes caused by motor imbalances and/or electromagnetic characteristics of the electric motor 1, even at comparatively high temperatures.

The invention is not limited to the embodiment described above. Rather, other variants of the invention can also be derived by those skilled in the art without departing from the scope of the invention. In particular, all the individual features described in connection with the exemplary embodiment can also be combined with one another in another manner without departing from the subject matter of the invention.

For example, the shape of the basic body 12 of the damping element 9 can generally also be cylindrical. In addition, the circumferentially open slot regions 13 can be designed to be identical on all four circumferential surfaces of the basic body 12. Furthermore, the or each circumferentially open slot region 13, 17 can extend over virtually any desired sections of the radial thickness d of the damping element 9 or its basic body 12. Furthermore, the bores 15 can be either strictly radial or oblique, as shown in FIG. 2. In addition, an azimuthal profile of individual bores 15 in the circumferential direction U is also conceivable.

The motor-side lugs (radial lugs) 8 can be attached to its motor housing 6, formed by its material with punching and bend technology or molded onto an (not shown) which accommodates the electric motor 1.

The radial depth and thus the radial thickness d of the material spokes 14 or their spoke sections 14a, 14b can suitably be adapted to the wall thickness of the respective recess or holding contour 10 of the external housing 3. A region remaining in the radial direction R without material-free recesses is expedient to increase the stability of the essentially X-shaped damping element 9.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. An apparatus for a vibration-decoupled mounting of an electric motor, in particular of a fan drive of a heating or air conditioning system of a motor vehicle, the apparatus comprising:
a plurality of resilient damping elements that are plug-mounted on a motor side;
a plurality of holding contours arranged in an external housing at least partially surrounding the motor housing;
wherein at least one of the respective damping elements has a central insertion slot for receiving a motor-side radial lug,
wherein the at least one of the respective damping elements has material spokes extending outwards from the insertion slot in a manner of a star, forming mutually facing spoke sections between which material-free slot regions are formed,
wherein the material-free slot regions are recessed from a contact surface of the at least one of the damping elements, the contact surface facing the electric motor, and
wherein the at least one of the damping elements further includes at least one additional material-free slot region that is recessed at least partially from a side surface thereof, the side surface being perpendicular to the contact surface.

2. The apparatus according to claim 1, wherein material spokes of the mutually facing spoke sections of the damping element are arranged in an X-shape.

3. The apparatus according to claim 1, wherein at least one or two of the material-free slot regions in the direction along the radial lug extend over only a part of the radial thickness of the damping element extending in the direction of insertion.

4. The apparatus according to claim 1, wherein at least one or two of the material-free slot regions are formed between mutually facing spoke sections by a bead-like material recess with a bead floor facing the insertion slot and two bead side walls extending in a direction of the radial lug, as well as a bead wall running transversely to the insertion direction of the insertion slot.

5. The apparatus according to claim 1, wherein the damping element has material regions between the spoke sections extending along the radial lug in the direction of insertion, in which the at least one additional material-free slot region is provided and extends towards the insertion slot.

6. The apparatus according to claim 1, wherein at least one material recess extending in the direction of insertion in the form of a through-hole or blind bore is inserted in the spoke sections of the damping element relative to a motor axis of the electric motor, arranged axially above and/or below the insertion slot.

7. The apparatus according to claim 1, wherein the damping element is mirror-symmetrical with respect to the insertion slot.

8. The apparatus according to claim 1, wherein the spoke sections run V-shaped relative to each other, axially above and below the insertion slot of the damping element with respect to the motor axis of the electric motor.

9. The apparatus according to claim 1, wherein, in a region of the insertion slot between the section ends of the spoke sections facing the insertion slot, a material-free transition is formed which extends over the entire width of the damping element and along the radial lug, and only over part of the radial thickness of the damping element extending in the direction of insertion.

10. The apparatus according to claim 9, wherein the respective damping element has the material-free transition in a region of the contact surface facing the electric motor.

11. The apparatus according to claim 1, wherein the respective damping element has a substantially cuboid basic body and wherein a radial through-hole or blind bore is insertable for damping different oscillation frequencies as a result of operation-induced oscillation excitations.

12. The apparatus according to claim 1, wherein the at least one additional material-free slot region is partially provided on a rear-side support surface facing away from the contact surface facing the electric motor.

13. An electric motor, in particular a fan drive of a heating or air conditioning system of a motor vehicle, comprising a plurality of elastic damping elements that are plug-mounted on a motor side according to claim 1.

14. An electric motor, in particular a fan drive of a heating or air conditioning system of a motor vehicle, comprising a plurality of elastic damping elements that are plug-mounted on a motor side,
   wherein a plurality of holding contours arranged in an external housing at least partially surrounding the motor housing,
   wherein at least one of the respective damping elements has a central insertion slot for receiving a motor-side radial lug,
   wherein the at least one of the respective damping elements has material spokes extending outwards from the insertion slot in a manner of a star, forming mutually facing spoke sections between which material-free slot regions are formed, and
   wherein the motor housing is formed by a first bearing plate and a second bearing plate, each with a flange region from which the radial lugs for the damping elements are formed.

15. An electric motor, in particular a fan drive of a heating or air conditioning system of a motor vehicle, comprising a plurality of elastic damping elements that are plug-mounted on a motor side,
   wherein a plurality of holding contours arranged in an external housing at least partially surrounding the motor housing,
   wherein at least one of the respective damping elements has a central insertion slot for receiving a motor-side radial lug,
   wherein the at least one of the respective damping elements has material spokes extending outwards from the insertion slot in a manner of a star, forming mutually facing spoke sections between which material-free slot regions are formed, and
   wherein the motor housing is held in a decoupled manner via the damping elements in a two-part external housing with an annular or frame-shaped first housing part and a second housing part joined thereto, wherein the holding contours for the damping elements are inserted in the first and second housing parts in the form of insertion pockets with supporting and/or joining elements.

16. The apparatus according to claim 4, wherein the bead wall running transversely to the insertion direction of the insertion slot extends perpendicular to the bead floor.

17. The apparatus according to claim 1, wherein the material-free slot regions extend only partially through the at least one of the damping elements in an insertion direction of the insertion slot.

18. The apparatus according to claim 2, wherein the material spokes are provided in a base body of the at least one of the damping elements and each of the material spokes include a lug that projects beyond the base body in a direction perpendicular to an insertion direction of the insertion slot.

19. The apparatus according to claim 2, wherein a respective one of the material-free slot regions is provided between every two of the material spokes of the mutually facing spoke sections and a through-hole or blind bore is provided in each material spoke, the through-hole or blind bore extending in an insertion direction of the insertion slot.

* * * * *